United States Patent [19]

Starkey

[11] Patent Number: 5,384,339
[45] Date of Patent: Jan. 24, 1995

[54] EPOXY BASED BALANCING COMPOUND AND METHOD FOR BALANCING A ROTOR UTILIZING AN ULTRAVIOLET-CURABLE EPOXY RESIN COMPOSITION

[76] Inventor: Donn R. Starkey, 2507 CR 60, Auburn, Ind. 46706

[21] Appl. No.: 28,217

[22] Filed: Mar. 9, 1993

[51] Int. Cl.⁶ .......................... C08F 2/50; B32B 31/00
[52] U.S. Cl. ................................ 522/3; 522/24; 522/25; 522/31; 522/74; 522/77; 522/80; 522/81; 522/83; 156/64; 156/330
[58] Field of Search .................. 152/425; 156/64, 330; 522/24, 170, 3, 25, 31, 74, 77, 80, 81, 83

[56] References Cited

U.S. PATENT DOCUMENTS

| | | | |
|---|---|---|---|
| 1,209,730 | 12/1916 | Leblanc | 117/18 |
| 1,761,023 | 6/1930 | Pontis | 117/18 |
| 3,247,004 | 4/1966 | Dosser | 117/18 |
| 3,291,630 | 12/1966 | Deyle et al. | 117/18 |
| 3,312,847 | 4/1967 | Waclaw | 310/271 |
| 3,349,478 | 10/1967 | De Jean | 29/698 |
| 3,939,020 | 2/1974 | Caramanian | 152/425 |
| 4,083,735 | 4/1978 | Caramanian | 156/64 |
| 4,246,298 | 1/1981 | Guarnery et al. | 528/89 |
| 4,308,118 | 12/1981 | Dudgeon | 204/159.11 |
| 4,551,215 | 11/1985 | Sakamoto et al. | 204/159.23 |
| 4,593,051 | 6/1986 | Koleske | 522/31 |
| 4,629,779 | 12/1986 | Koleske | 528/408 |
| 4,738,899 | 4/1988 | Bluestein et al. | 428/413 |
| 4,954,534 | 9/1990 | Yamamuro | 522/28 |
| 4,975,471 | 12/1990 | Hayase et al. | 522/13 |
| 4,987,158 | 1/1991 | Eckberg | 522/31 |
| 5,124,234 | 6/1992 | Wakata et al. | 522/120 |

OTHER PUBLICATIONS

"UV Curing: Science and Technology" Technology Marketing Corporation, pp. 24, 70–71, S. Pappas.
Polychem Corp., UV 5029 Balance Fast Resin product data sheet, one page.

*Primary Examiner*—Susan W. Berman
*Attorney, Agent, or Firm*—George Pappas

[57] ABSTRACT

A balancing compound comprising an epoxy resin, a photoinitiator in an effective amount to cure the resin at ambient temperatures upon the application of ultraviolet light (10 nm to 400 nm) of less than 40 watts per square centimeter in less than about 30 seconds, and a filler in an effective amount to give the compound a specific gravity above 1.1.

51 Claims, No Drawings

EPOXY BASED BALANCING COMPOUND AND METHOD FOR BALANCING A ROTOR UTILIZING AN ULTRAVIOLET-CURABLE EPOXY RESIN COMPOSITION

BACKGROUND OF THE INVENTION

The subject matter of the invention relates to epoxy resin compositions and methods of balancing a rotor utilizing the same, and more particularly, to an ultraviolet light curable cross-linked epoxy resin composition and a method for dynamically balancing motor armatures and other rotors by dynamically testing the rotors repeatedly and applying an ultraviolet cured cross-linkable epoxy resin composition between tests to achieve the balance required.

Rotors such as electric motor armatures have previously been balanced utilizing a two-part epoxy based composition which is applied to an armature in a putty like consistency which is sufficiently tacky, adherent and cohesive to adhere to the armature during dynamic testing for balance prior to curing, dynamically testing the rotor with the balancing compound in position thereon, adjusting both the amount of the balancing position and the position of the balancing compound on the rotor to achieve the desired balance, and then curing the resin. See U.S. Pat. No. 3,939,020. This two-part epoxy composition includes one part which includes the epoxy resin and another part which includes the catalyst for curing the resin. Each part of the composition is stored separately from the other part until ready for use. When balancing is to be accomplished, the two parts of the composition are mixed in equal amounts by weight and the dynamic balancing of the armature is carried out by the method above-described. After desired balancing is achieved, the balancing compound can be cured either by allowing the armature to stand at room temperature for a period of time or heating the rotor.

Single part epoxy balancing compounds have also been proposed that have a shelf life of about three months at ambient temperatures. These balancing compounds can be utilized to balance motor armatures and other rotors in a similar manner as above described except that curing may be achieved within a range from about six minutes to about three hours at elevated temperatures, for example, 45 minutes at 300° F. One example of these compositions are the BC motor balancing compounds by Star Technology, Inc.

Both of these prior balancing compounds require a large amount of energy or a large amount of time to cure the epoxy balancing composition. Some require both. In the balancing compound of U.S. Pat. No. 3,939,020, the balanced armature can be cured in about 20 minutes by heating the compound to a temperature of about 200° F. In others, cure oven temperatures are used as high as 400° F. for four hours. In some cases, these temperatures for prolonged times can cause the motor armature to distort and be once again out of balance or can cause another portion of the armature to thermally degrade. In the specific instance of armatures, the copper windings can expand and relocate upon curing to cause the armature to be again out of balance.

Prior balancing compounds are used in pieces or lumps, and it has always been a problem to thoroughly cure the balancing composition on the rotor in less than about four minutes. This is especially true with those balancing compounds which are heavily filled with mineral fillers which are applied to highly conductive metals such as those which predominate in a motor armature. It is believed that this lack of deep section cure is due to the temperature gradient between the outside of the piece or lump of balancing compound and the inside of the piece or lump normally experienced when oven curing these compounds on an armature of highly conductive metal. Some but not all of this deep cure problem can be overcome with catalysts.

Some manufacturers test armatures by spinning them at from about 2,000 rpm to about 15,000 rpm at elevated temperatures from about 250° F. to about 300° F. for about 30 seconds followed by balance tests. These spin tests show failures when the balancing compound is not fully cured, or when the heat deformation temperature of the compound is sufficiently lower than the test temperature.

It is therefore highly desirable to provide an improved balancing compound.

It is also highly desirable to provide an improved balancing compound which is a single part epoxy based composition which can be applied to an armature in either a paste-like consistency or a putty-like consistency.

It is also highly desirable to provide an improved balancing compound which can be provided in a single part epoxy compound which does not require mixing or formulation prior to use and has an appreciable shelf life.

It is also highly desirable to provide an improved balancing compound which can be cured rapidly at room temperature such that the balancing compound can be used on devices easily thermally degradable.

It is also highly desirable to provide an improved balancing compound which can be thoroughly cured by exposure to ultraviolet light and/or heat in a relatively short time, It is also highly desirable to provide an improved balancing compound which remains in place upon the rotor during spin tests at elevated temperatures, It is finally highly desirable to provide an improved balancing compound which has all of the features above mentioned.

SUMMARY OF THE INVENTION

It is therefore an object of the invention to provide an improved balancing compound, It is also an object of the invention to provide an improved balancing compound which is a single part epoxy based compound which can be applied to an armature in either a paste-like consistency or a putty-like consistency, It is also an object of the invention to provide an improved balancing compound which can be provided in a single part epoxy compound which does not require mixing or formulation prior to use and has an appreciable shelf life.

It is also an object of the invention to provide an improved balancing compound which can be cured rapidly at room temperature such that the balancing compound can be used on devices easily thermally degradable.

It is also an object of the invention to provide an improved balancing compound which can be thoroughly cured by exposure to ultraviolet light and/or heat in a relatively short time, It is also highly desirable to provide an improved balancing compound which remains in place upon the rotor during spin tests at elevated temperatures.

It is finally an object of the invention to provide an improved balancing compound which has all of the features above mentioned.

In the broader aspects of the invention, there is provided a balancing compound comprising an epoxy resin, a photoinitiator in an effective amount to cure the resin at ambient temperatures upon the application of ultraviolet light (10 nm to 400 nm) of less than 40 watts per square centimeter in less than about 30 seconds, and a filler in an effective amount to give the compound a specific gravity above 1.1.

DESCRIPTION OF A SPECIFIC EMBODIMENT

The improved balancing compound of the invention is an epoxy resin composition which can be effectively cured throughout by exposure to both ultraviolet light and heat relatively quickly without experiencing substantial shrinking or weight loss. The composition is electrically insulative and bonds well to metals, other resinous materials, ceramics, and glasses.

The improved balancing compound of the invention comprises an epoxy resin in an amount of from about 13% to about 90% weight of the total compound. The epoxy resin component can comprise one or more epoxidic prepolymers. These prepolymers can be crosslinked when cured into a solid matrix through the epoxide groups of the polymer.

These epoxidic prepolymers can be combined with any number of (1) polyols to adjust molecular weight of the prepolymers and provide the desired amount of crosslinking in the balancing compound, (2) a photoinitiator in an effective amount capable of causing cationic polymerization of the epoxy resin when the initiator is exposed to sufficient ultraviolet radiation or sufficient thermal energy, (3) an effective amount of photosensitizer or pigment which causes the photoinitiator to become more active when exposed to ultraviolet light and sensitive to additional wavelengths of light which would normally have no effect on the photoinitiator, (4) an effective amount of filler to raise the specific gravity of the balancing compound to a desired specific gravity, (5) an effective amount of wetting agent to insure that the filler is wet by the resin and to minimize refraction and reflection of the ultraviolet light at resin/filler interfaces, (6) an effective amount of a thixotrope to maintain the filler in a homogeneous suspension with the resin, and (7) an effective amount of catalyst to insure the desired cure rate.

Typical formulations of the improved balancing compound of the invention are:

|  | PHR |
| --- | --- |
| Epoxy resin | 100.0 |
| Polyol | 0.0–100.0 |
| Photoinitiator | 0.1–4.0 |
| Fillers | 10–550 |
| Photosensitizers | 0.0–5.0 |
| Wetting agent | 0.01–1.0 |
| Catalyst | 0.01–5.0 |

The epoxy resin component of the improved balancing compound of the invention is an epoxidic prepolymer or a combination of a plurality of epoxidic prepolymers of any of the known monomeric, dimeric, oligomeric or polymeric epoxy materials containing one or a plurality of epoxy functional groups. Preferably, they will be members of the classes described chemically as (a) an epoxidic ester having two epoxycycloalkyl groups; (b) an epoxy resin prepolymer consisting predominately of the monomeric diglycidyl ether of bisphenol A; (c) a polyepoxidized phenol novolak or cresol novolak; (d) a polyglycidyl ether of a polyhydric alcohol; (e) a diepoxide of a cycloalkyl or alkylcycloalkyl hydrocarbon or ether; (f) halogenated versions of any of the above; or (g) a mixture of any of the foregoing. To save unnecessarily detailed description, reference is made to the Encyclopedia of Polymer Science and Technology, Vol. 6, 1967, Interscience Publishers, New York, pages 209–271.

Suitable commercially available epoxidic esters are 3,4-epoxycyclohexylmethyl, 3,4-epoxycyclohexanecarboxylate (Union Carbide ERL 4221, Ciba Geigy CY-179); as well as bis(3,4-epoxy-6-methylcyclohexylmethyl)adipate (Union Carbide ERL 4289); and bis(3,4-epoxycyclobexylmethyl)adipate (Union Carbide ERL 4299).

Suitable commercially available diglycidyl ethers of bispbenol-A are Ciba Geigy Araldite 6010, Dow Chemical DER 331, and Shell Chemical Epon 828.

A polyepoxidized phenol formaldehyde novolak prepolymer is available from Dow Chemical as DEN 431 and 438, and a polyepoxidized cresol formaldehyde novolak prepolymer is available from Ciba-Geigy as Araldite 538.

A polyglycidyl ether of a polyhydric alcohol is available from Ciba-Geigy, based on butane-1,4-diol, as Araldite RD-2; and from Shell Chemical Corp., based on glycerine, as Epon 812.

A suitable diepoxide of an alkylcycloalkyl hydrocarbon is vinyl cyclohexene dioxide, (Union Carbide ERL 4206); and a suitable diepoxide of a cycloalkyl ether is Bis(2,3epoxycyclopentyl)-ether, (Union Carbide ERL 0400).

In a specific embodiment, the epoxy resin component is chosen from the group consisting of bisphenol A, bisphenol F, novolak, difunctional glycidol ester, and cycloaliphatic based epoxy resins, organosilicon monomers having a six member silicon dioxide ring, and sulfur containing monomers having three and four member sulfur containing rings, and combinations thereof. These latter two, while not technically epoxy resins, are included within the definition as that term is used in this application and may be more clearly identified by the following illustrations:

In choosing the particular combination of epoxidic prepolymers, the functionality of the resin to act as a binder to be crosslinked into a solid matrix should be taken into consideration. The bisphenol-A and bisphenol-F glycidol ether resins are relatively brittle. In contrast, the cycloaliphatic resins are relatively flexible. The novolak resins are relatively tacky and assist the resins to adhere to the rotor being balanced. The tetraglycidol ether of tetraphenolethane and the glycidated novolaks have a high aromatic ring content combined with polyfunctionality and provide relatively high thermal stability for higher temperature applications. Mono and difunctional diluents such as polyols, divinyl ethers, divinyl esters and the like can alter the molecular weight of the resin as desired.

The viscosity of the balancing compound and the flexibility thereof when cured can be adjusted by the choice of resin. Decreased viscosity and increased flexibility result from additional divinyl ethers or divinyl esters. Decreased flexibility results from the use of bisphenol-A epoxides and epoxy novolaks.

Beside the novolak resins, the tackifiers and/or adhesion promoters include polyvinylethylether, polyvinylisobytaleether, polyvinylbutyl, polyisobutylene, styrene/butydiencopolymer rubber, butyl rubber, vinyl chloride/vinyl acetate copolymer, chlorinated rubbers, acrylic resin tackifiers and aromatic, aliphatic and alkylcyclic petroleum resins.

The amount of polyol can increase or decrease the cross-linked density of the reacted epoxy resin. Additionally, polyols (usually di or trifunctional alcohols) can accelerate cure rates of the resin. Cure rates may be increased by maintaining a Union Carbide R value between 1.5 and 3, where:

$$R = \frac{\text{g Epoxy/Epoxy Eq. Wt.}}{\text{g Polyol/Hydroxyl Eq. Wt.}}$$

The addition of polyols can also be used to adjust the viscosity of the balancing compound. Experience would indicate that the higher the R value, the harder the balancing compound, the lower the R value, the more adhesion and flexibility the balancing compound will exhibit.

The polyols which can be used in combination with the epoxy resin of this invention can be produced in situ by polymerizing one or more ethylenically unsaturated monomers dissolved or dispersed in a base polyol in the presence of a free radical catalyst. The production of polymer/polyols is more fully described in, for example, U.S. Pat. Nos. Re. 28,715, 29,118, U.S. Pat. No. 3,652,639, U.S. Pat. No. Re. 29,014, U.S. Pat. No. 3,950,317, U.S. Pat. Nos. 4,208,314, 4,104,236, 4,172,825 and U.S. Pat. No. 4,198,488.

Substantially any of the polyether polyols previously used in the art to make polymer/polyols can be used in this invention. Illustrative of the polyether polyols useful in producing polymer/polyol compositions are the polyhydroxyalkanes, the polyoxyalkylene polyols, or the like. Among the polyether polyols which can be employed are those selected from one or more of the following classes of compositions, alone or in admixture:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts of polyphenols;
(e) The polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-1,5-, and 1,6-dihydroxyhexane, 1,2-, 1,3-, 1,4-1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the ethylene oxide, propylene oxide, butylene oxide, or mixtures thereof, adducts of trihydroxyalkanes.

A further class of polyether polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyether polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novolak resins, condensation products of various phenolic compounds and acrolein; the simplest member of this class being the 1,1,3-tris(hydroxyphenyl)propanes, condensation products of various phenolic compounds and glyoxal, glutaraldehyde, and other dialdehydes, the simplest members of this class being the 1,1,2,2,-tetrakis(hydroxyphenol) ethanes, and the like.

The alkylene oxide adducts of phosphorus and polyphosphorus acids are another useful class of polyether polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

The polyether polyols employed can have hydroxyl numbers which vary over a wide range. In general, the hydroxyl numbers of the polyols employed in the invention can range from about 15, and lower, to about 900, and higher. The hydroxyl number is defined as the number of milligrams of potassium hydroxide required for the complete neutralization of the fully phthalated derivative prepared from 1 gram of polyol. The hydroxyl number can also be defined by the equation:

$$OH = \frac{56.1 \times 1000 \times f}{\text{m.w.}}$$

where
OH=hydroxyl number of the polyol;
f=functionality, that is, average number of hydroxyl groups per molecule of polyol; and
m.w.=molecular weight of the polyol.

The most useful polyols include glycols and both aliphatic and aromatic hydroxyl compounds containing 2 or more hydroxyl groups, for example ethylene glycol; glycerin; pentaerythrytol; 1,1,1-trimethylol ethane; 1,1,1- trimethylol propane; zorbitol; manitol; dipentaerythitol; and a,ω-aliphatic hydrocarbon diols having four to five carbon atoms; cyclic glycols; hydroquinone dibetahydroxy ethyl ether; 1,4-cyclohexane dimethylol; polyethylene glycol; polytetramethylene oxide glycol; and combinations thereof. Examples of the aliphatic diols are 1,4 butane diol; 1,5 pentane glycol; neopenthylene glycol; 1,4-butene-2-diol propylene glycol; and combinations thereof. Examples of the cyclic diols are 2,2,4,4-tetramethyl-1,3-cyclobutane diol, and tris(2hydroxyethyl)isocyanurate and combinations thereof; ethylene glycol, diethyleneglycol, the poly(oxypropylene)-glycols, triols and higher functionality polyols. These polyols also include poly(oxypropylene-oxyethylene)-polyols; however, desirably, the oxyethylene content should comprise less than 80% of the total and preferably less than 60%.

The ethylene oxide when used can be incorporated in any fashion along the polymer chain. Stated another way, the ethylene oxide can be incorporated either in internal blocks, as terminal blocks, or may be randomly distributed along the polymer chain.

As is well known in the art, the polyols that are most preferred herein contain varying small amounts of unsaturation. Unsaturation in itself does not affect in any adverse way the formation of the coating compositions in accordance with the present invention. It should be appreciated that a blend or mixture of more than one base polyol can be utilized, if desired, to form the polymer/polyol.

Suitable commercially available blended or mixed organic polyols are the polycaprolactone polyols such as TONE-0200 and TONE-0305 from Union Carbide Corporation, the dihydroxy functional polytetramethylene oxide polyols such as Polymeg 650, 1000 and 2000 from Quaker Oats Company, polyether polyols capped with ethylene oxide such as propylene oxide polyols capped with ethylene oxide, e.g., E-480, E-474, NIAX Polyol 11-27 and NIAX Polyol 11-34 from Union Carbide Corporation, and of course the ethylene oxide and propylene oxide adducts including ethylene glycol, diethylene glycol, the poly(oxyethylene)glycols, the poly(oxypropylene glycols, triols and higher functionality polyols such as LHT-67, LHT-112 and LG-56 from Union Carbide Corporation. These polyols also include poly(oxypropylene-oxyethylene)polyols; however, desirably, the oxyethylene content should comprise less than 80% of the total and preferably less than 60%.

The ethylene oxide when used can be incorporated as internal Blocks along the polymer chain. As is well known in the art, the polyols that are preferred herein contain varying small amounts of unsaturation. Unsaturation in itself does not affect in any adverse way the balancing compound in accordance with the present invention.

Other representative examples of suitable blended or mixed organic polyols that may be employed in minor amounts in the balancing compound of this invention include copolymers of hydroxypropyl and hydroxyethyl acrylates and methacrylates with other free radical-polymerizable monomers such as acrylate esters, vinyl halides, vinyl acetate, or styrene; copolymers containing pendent hydroxy groups formed by hydrolysis or partial hydrolysis of vinyl acetate copolymers, polyvinylacetal resins containing pendent hydroxyl groups; modified cellulose polymers such as hydroxyethylated and hydroxypropylated cellulose; hydroxy terminated polyesters and hydroxy terminated polyalkadienes. The polyester polyols are the reaction products of polyfunctional organic carboxylic acids and polyhydric alcohols and include, for example, poly(hexamethylene adipate), poly(ethylene adipate), poly(butylene adipate) and the like. Many of these organic polyols can be prepared by conventional methods and are commercially available from a number of manufacturers such as polyviylacetal resins commercially available from Monsanto Chemical Company as Butvat B-72A, B-73, B-76, B-90 and B-98 and as Formvar 7/70, 12/85, 7/95S, 7/95E, 15/95S and 15/95E; an aliphatic polyester diol commercially available from Rohm and Haas as Paraplex U-148; saturated polyester polyols commercially available from Mobay Chemical Company as Multron R-2, R-12A, R-16, R-18, R-38, R-68, and R-74; a hydroxypropylated cellulose having an equivalent weight of approximately 100 commercially available from Hercules, Inc. as Klucel E, and a cellulose acetate butyrate ester having a hydroxyl equivalent weight of approximately 400 commercially available from Eastman Kodak as Alcohol Soluble Butyrate.

The polycaprolactone polyols, alone or in admixture, that can be used to prepare the balancing compound of this invention include any of the known polycaprolactone polyols that are commercially available. The polycaprolactone polyols are produced by the catalytic polymerization of an excess of lactone and an organic polyfunctional initiator having at least two reactive hydrogen atoms. The organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycols, polypropylene glycols, neopentyl glycol, 1,4-butanediol, poly(oxyethyleneoxypropylene)glycols, and similar polyalkylene glycols, either blocked, capped or heteric, containing up to about 40 or more alkyleneoxy units in the molecule, 3-methyl-1-5 pentanediol, cyclohexanediol, 4,4'-methylene-bis-cyclobexanol, 4,4'-isopropylidene-bis-cyclohexanol, xylenediol, 2-(4-hydroxymethylphenyl-)ethanol, 1,6-hexanediol and the like; triols such as glycerol, trimethylolpropane, 1,2,6-hexanetriol, triethanolamine, triisopropanolamine, and the like; tetrols such as erythritol, pentaerythritol, dipentaerythritol, sorbitol, N,N,N'-N'-tetrakis(2-hydroxyethyl)ethylene diamine, and the like.

When the organic functional initiator is reacted with the caprolactone a reaction occurs that can be represented in its simplest form by the equation:

R"(OH)$_x$ + O=C(CR'$_2$)$_4$CHR' ——⟶
           |_____|
           O

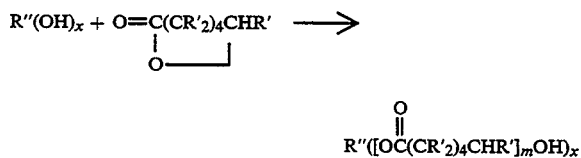

In this equation the organic functional initiator is the R"(OH)$_x$ compound and the caprolactone is the

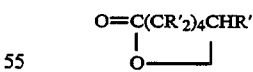

compound; this can be epsilon caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 200 to about 6,000. The preferred polycaprolactone polyol compounds are those having an average molecular weight of from about 290 to about 6,000, most preferably from about 290 to 3,000. The most preferred are the polycaprolactone diol compounds having an average molecular weight of from about 290 to about 1,500 and the polycaprolactone triol and tetrol compounds having an average molecular weight of from about 290 to about 3,000; these are most preferred because of their low viscosity properties. In the formula m is an integer representing the average number of repeating units needed to produce the compound having said molecular weights. In the formula x is an integer having an average value of from about 2 to 8, preferably 2 to 4. The hydroxyl number of the polycaprolactone polyol can be from about 15 to 600, preferably from 200 to 500; and the polycaprolactone can have an average of from 2 to 8, preferably 2 to 4, hydroxyl groups.

Illustrative of polycaprolactone polyols that can be used in preparing the adduct compositions of this invention, one can mention the reaction products of a polyhydroxyl compound having an average from 2 to 8 hydroxyl groups with caprolactone. The manner in which these type polycaprolactone polyols is produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compounds; this figure is shown in the third column.

POLYCAPROLACTONE POLYOLS

| Initiator | Average MW of polyol | Average No. of CPL units in molecules |
|---|---|---|
| 1 Ethylene glycol | 290 | 2 |
| 2 Ethylene glycol | 803 | 6.5 |
| 3 Ethylene glycol | 2,114 | 18 |
| 4 Propylene glycol | 874 | 7 |
| 5 Octylene glycol | 602 | 4 |
| 6 Decalene glycol | 801 | 5.5 |
| 7 Diethylene glycol | 527 | 3.7 |
| 8 Diethylene glycol | 847 | 6.5 |
| 9 Diethylene glycol | 1,246 | 10 |
| 10 Diethylene glycol | 1,998 | 16.6 |
| 11 Diethylene glycol | 3,526 | 30 |
| 12 Triethylene glycol | 754 | 5.3 |
| 13 Polyethylene glycol (MW 200)* | 713 | 4.5 |
| 14 Polyethylene glycol (MW 600)* | 1,398 | 7 |
| 15 Polyethylene glycol (MW 1500)* | 2,868 | 12 |
| 16 1,2-Propylene glycol | 646 | 5 |
| 17 1,3-Propylene glycol | 988 | 8 |
| 18 Dipropylene glycol | 476 | 3 |
| 19 Polypropylene glycol (MW 425)* | 835 | 3.6 |
| 20 Polypropylene glycol (MW 1000)* | 1,684 | 6 |
| 21 Polypropylene glycol (MW 2000 | 2,456 | 4 |
| 22 Hexylene glycol | 916 | 7 |
| 23 2-Ethyl-1,3-hexanediol | 602 | 4 |
| 24 1,5-Pentanediol | 446 | 3 |
| 25 1,4-Cyclohexanediol | 629 | 4.5 |
| 26 1,3-bis(hydroxyethyl)-benzene | 736 | 5 |
| 27 Glycerol | 548 | 4 |
| 28 1,2,6-Hexanetriol | 476 | 3 |
| 29 Trimethylolpropane | 590 | 4 |
| 30 Trimethylolpropane | 750 | 5.4 |
| 31 Trimethylolpropane | 1,103 | 8.5 |
| 32 Triethanolamine | 890 | 6.5 |
| 33 Erythritol | 920 | 7 |
| 34 Pentaerythritol | 1,219 | 9.5 |
| 35 1,4-Butanediol | 546 | 4 |

POLYCAPROLACTONE POLYOLS

| Initiator | Average MW of polyol | Average No. of CPL units in molecules |
|---|---|---|
| 36 Neopentyl Glycol | 674 | 5 |

*Average molecular weight of glycol.

The structures of the compounds in the above tabulation are obvious to one skilled in the art based on the information given. The structure of compound No. 7 is:

wherein the variables r and q are integers, the sum of r+q has an average value of 3.7 and the average molecular weight is 527. The structure of compound No. 20 is:

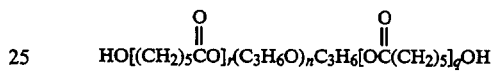

wherein the sum of r+q has an average value of 6 and the average molecular weight is 1,684. This explanation makes explicit the structural formulas of compounds 1 to 36 set forth above.

Although not specifically mentioned above, it is appreciated that other lactone based polyols can be used in preparing the adduct compositions of this invention. Illustrative of other lactone based polyols include those derived from beta-propiolactone, delta-valerolactone, zeta-enantholactone and the like including derivatives thereof such as gamma-methyl-delta-valerolactone and the like.

Examples of the monohydric alcohol in the acrylate or methacrylate of the monohydric alcohol include methanol, ethanol, propanol, isopropanol, n-butanol, isobutanol, t-butanol, cycloheyl alcohol, benzyl alcohol, octyl alcohol, 2-ethyl hexanol, lauryl alcohol, n-decanol, undecanol, cetyl alcohol, stearyl alcohol, methoxyethyl alcohol, ethoxyethyl alcohol, butoxyethyl alcohol, polyethylene glycol monomethyl alcohol, polyethylene glycol monoetbyl alcohol, 2-hydroxy-3-chloropropane, dimethylamino alcohol, diethylamino alcohol, glycidol, 2-trimethoxysilyl ethanol, ethylene chlorohydrin, ethylene bromohydrin, 2,3-dibromo propanol, allyl alcohol, oleyl alcohol, epoxystearyl alcohol, phenol and naphthol. Examples of the polyhydric alcohol thereof include ethylene glycol, 1,2-propanediol, 1,3-propanediol, 1,4-butanediol, 1,5-pentanediol, hexanediol, heptanediol, octanediol, nonanediol, dodecanediol, neopentyl glycol, 1,10-decanediol, 2-butene-1,4-diol, 2-n-butyl-2-ethyl propanediol, cycloheptanediol, 1,4-cyclohexanedimethanol, 3-cyclohexene-1,1-diethanol, polyethylene glycol (e.g., diethylene glycol, triethylene glycol), polypropylene glycol (e.g., dipropylene glycol, tripropylene glycol), polystyrene oxide glycol, polytetrabydrofuran glycol, xylilenediol, bis(B-hydroxyethoxy)benzene, 3-chloro-1,2-propanediol, 2,2-dimethyl-1,3-propanediol, decalindiol, 1,5-dihydroxy-1,2,3,4-tetrahydronaphthalene, 2,5-dimethyl-2,5-hexanediol, 2-ethyl-1,3-hexanediol, 2-ethyl-2-(hydroxymethyl)-1,3-propanediol, 2-ethyl-2-methyl-1,3-propanediol, 3-hexene-2,5-diol, hydroxybenzyl alcohol, 2-methyl-1,4-butanediol, 2-methyl-2,4-pentanediol, 1-phenyl-1,2-ethanediol, 2,2,4,4-tetramethyl-1,3-cyclobutanediol, 2,3,5,6-tetramethyl-p-xylene-a,a-diol, 1,1,4,4-tetraphenyl-2-butyn-1,4-diol, 1,1-bi-2-naphthol, dibydroxynaphthalene, 1,1-methylene-di-2-naphthol, biphenol, 2,2-bis(4-hydroxyphenyl)butane, 1,1-bis(4-hydroxyphenyl)cyclohexane, bis(hydroxyphenyl)methane, catechol, resorcinol, 2-methylresorcinol, 4-chlororesorcinol, pyrogallol, a-(1-aminoethyl)-p-hydroxybenzyl alcohol, 2-amino-2-methyl- 1,3-propanediol, 2-amino-2-ethyl-1,3-propanediol, 3-amino-1,2-propanediol, N-(3-aminopropyl)-diethanolamine, N,N-bis(2-hydroxyethyl)piperazine, 1,3-bis(hydroxymethyl)urea, 1,2-bis(4-pyridyl)-1,2-ethanediol, N-n-butyldiethanolamine, diethanolamine, N-ethyldiethanolamine, 3-mercapto-1,2-propanediol, 3-piperidine-1,2-propanediol, 2-(2-pyridyl)1,3-propanediol, a- (1-aminoethyl)-p-hydroxybenzyl alcohol, glycerol, trimethylolethane, trimethylolpropane, pentaerythritol, dipentaerythritol, tripentaerythritol, sorbitol, glucose, a-mannitol, butanetriol, 1,2,6-trihydroxyhexane, 1,2,4-benzenetriol, triethanolamine and 2,2-bis-(hydroxymethyl)-2,2′,2″-nitrilotriethanol. Among these acrylates and methacrylates of monohydric and polyhydric alcohols, ethylene glycol diacrylate, ethylene glycol dimethacrylate, polyethylene glycol diacrylate, polyethylene glycol dimethacrylate, pentaerythritol triacryate, pentaerythritol trimethacrylate, pentaerythritol tetraacrylate, pentaerythritol tetramethacrylate, dipentaerythritol hexaacrylate, dipentaerythritol hexamethacrylate, dipentaerythritol pentaacrylate, dipentaerythritol pentamethacrylate, glycerol triacrylate, glycerol trimethacrylate, trimethylolpropane triacrylate, trimethylolpropane trimethacrylate, trimethylolethane triacrylate, trimethylolethane trimethacrylate, neopentylglycol diacrylate, neopentylglycol dimethacrylate, sorbitol hesaacrylate, sorbitol hexamethacrylate, sorbitol pentaacrylate and sorbitol pentamethacrylate are particularly useful.

The epoxy resin and polyol is combined with a photoinitiator. The photoinitiator is capable of effecting cationic polymerization of the epoxy resin component when the initiator is exposed to ultraviolet radiation or sufficient thermal energy. The photoinitiator is always in an amount sufficient to cure the resin of the balancing compound upon being exposed to ultraviolet light. The photoinitiator is chosen from the group consisting of onium salts and combinations thereof. Suitable photoinitiators are the onium salts having the formulae:

$R_2I^+ MX_n^-$ $R_3S^+ MX_n^-$ $R_3Se^+ MX_n^-$ $R_4P^+ MX_n^-$ $R_4N^+ MX_n^-$ where radicals represented by R can be the same or different organic radicals from 1 to 30 carbon atoms, including aromatic carbocyclic radicals of from 6 to 20 carbon atoms which can be substituted with from 1 to 4 monovalent radicals selected from $C_{(1-8)}$ alkoxy, $C_{(1-8)}$ alkyl, nitro, chloro, bromo, cyano, carboxy, mercapto, and the like, and also including aromatic heterocyclic radicals including, e.g., pyridyl, thiophenyl, pyranyl, and the like, and $MX_n^-$ is a non-basic, non-nucleophilic anion, such as $BF_4^-$, $PF_6^-$, $AsF_6^-$, $SbF_6^-$, $SbCl_6^-$, $HSO_4^-$, $ClO_4^-$, and the like, the iron salts, especially the Ferrocenium class, such as Ferrocenium hexafluorophosphate, used with a peroxide or hydroperoxide. Useful peroxides include cumene hydroperoxide, benzoyl peroxide, tertiaryamyl hydroperoxide, dicumyl hydroperoxide or tertiarybutyl hydroperoxide.

The preferred onium salts for use herein are the diaryliodonium salts. Examples of suitable diaryliodonium salts are disclosed, for example, in U.S. Pat. No. 4,832,201, which is incorporated herein by reference. The most preferred of these salts is that having the formula:

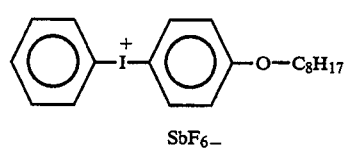

Examples of specific preferred bis-diaryl iodonium salts include, for example, bis(dodecyl phenyl)iodonium hexafluoroarsenate, and bis(dodecyl phenyl) iodonium hexafluoroantimonate, are preferred. Most preferred of these iodonium salts is bis(dodecyl phenyl)iodonium hexafluoroantimonate.

The photoinitiator suitable for use in the balancing compound of this invention also may be any one of the well known photoinitiators such as described in, for example, U.S. Pat. Nos. 4,231,951; 4,256,828; 4,138,255 and 4,058,401, which patents are incorporated herein by reference. Preferred photoinitiators include triarylsulfonium complex salts as decribed in U.S. Pat. No. 4,231,951, aromatic sulfonium or iodonium salts of halogen-containing complex ions as described in U.S. Pat. No. 4,256,828; aromatic onium salts of Group VIa elements as described in U.S. Pat. Nos. 4,058,401 and 4,138,255; aromatic onium salts of Group Va elements as described in U.S. Pat. No. 4,069,055. Such salts are commercially available as FC-508 and FC-509 (available from Minnesota Mining and Manufacturing Company), and as UVE-1014 (available from General Electric Company).

Examples of the photopolymerization initiator to be used in the present invention include a-diketones such as benzyl or diacetyl; acyloins such as benzoin; acyloin ethers such as benzoin methyl ether, benzoin ethyl ether and benzoin isopropyl ether; thioxanthones such as thioxanthone, 2,4-diethylthioxanthone, thioxanthone-1-sulfonic acid and thioxanthone-4-sulfonic acid; benzophenones such as benzophenone, 6,4,-bis(dimethylamino)-benzophenone and 4,4′,-bis(diethylamino) -benzophenone; acetophenones such as acetophonone, p-dimethylaminoacetophenone, a,a′-dimethoxyacetoxyacetophenone, 2,2,-dimethoxy-2-phenylacetophenone, p-methoxyacetophenone and 2-methyl-[4-(methylthio)-phenyl]-2-morpholino-1-propanone; quinones such as anthraquinone 1,4-naphthoquinone, halogen compounds such as phenacyl chloride, tribromomethylphenylsulfone and tris(trichloromethyl)-s-triadine; and peroxides such as di-t-butyl peroxide.

These compounds can be used either alone as the photopolymerization initiator or a mixture of two or more of them as the photopolymerization initiating system. Examples of the photopolymerization initiating system include the combination of 2,4,5- triarylimidazole dimer and 2-mercaptobenzoxazole or leuco crystal violet, the combination of 4,4-bis(dimethylamino)benzophenone and benzophenone or benzoin methyl ether as disclosed in U.S. Pat. No. 3,427,161, the combination of benzoyl-N-methyl naphtothiazoline and 2,4-bis(trichloromethyl)-6,-4-methoxyphenyl triazole as disclosed in U.S. Pat. No. 4,239,850; and the combination of dimethylthioxanthone and 4-dialkylaminobenzoate as disclosed in JP-A-57-23602.

These photopolymerization initiators or photopolymerization initiating system may be used preferably in an amount of from about 0.1 to 4 parts by weight, more preferably from about 0.2 to 2 parts by weight, based on the solid components of the liquid light-sensitive resin composition. When the amount of the same is less than about 0.1 part by weight, the resulting liquid light-sensitive resin composition has a poor sensitivity. When it exceeds about 4 parts by weight, on the other hand, the resulting liquid light-sensitive resin composition suffers from some problems such as the precipitation of crystals or insufficient hardening of the lower part.

Each of these photoinitiators useful in the balancing compound of the invention includes an organic acid component. The organic acid component forms a Lewis acid during the curing process.

The improved balancing compound of the invention also includes a filler combined with the epoxy resin, polyol if any, and photoinitiator. The filler is in an effective amount to give the compound a specific gravity above 1.1. Suitable fillers are not ultraviolet light opaque and are dispersed throughout the epoxy resin whereby the combination of the resin and the filler is homogeneous. The filler is chosen from the group consisting of quartz, silica, Pyrex, Flint and Crown glasses, and combinations thereof. The silica can be fused silica, fumed silica or crystalline silica. The glass may be in fiber form or particulate form. In all cases, the preferred filler is not UV-light opaque.

Some filler is used in all of the balancing compound as a thixotrope in an amount sufficient to maintain the filler and photoinitiator and resin in suspension and homogeneous. Thixotropes can also Be used to provide the improved balancing compound with the desired slump and to insure that when a putty is used, the adhesion cohesiveness and wet strength of the putty is sufficient to adhere sufficiently and strongly to the rotor being balanced that it stays in position on rotating the rotor during a dynamics balancing procedure. In specific embodiments, such can be subject to peripheral speeds of about 42 feet per second or the equivalent of rotation of 1,700 to 1,800 rpm. Those fillers useful as thixotropes in the invention are chosen from the group consisting of quartz silica, Pyrex glass, fumed silica, fumed silica with surface treatments of chorosilane or siloxane, Flint and Crown glasses, and other fine powders. The fine powders such as talc, mica or silicon dioxide, titanium dioxide, calcium carbonate, magnesium carbonate, barium carbonate, calcium sulfate, magnesium sulfate and barium sulfate are less preferred as they are not transparent to ultraviolet light.

In specific embodiments using transparent fillers, the bonding compound of the invention surprisingly may cure faster than unfilled epoxy resins as the filler is more transparent to ultraviolet light than the resin.

Photosensitizers are combined with the epoxy resin, the polyol, the photoinitiator and the filler in the improved balancing compound of the invention. Photosensitizers are in the compound in an effective amount to catalyze the photoinitiators or to convert visible light into ultraviolet light and in combination with the photoinitiators above-mentioned to cure the resin of the compound at ambient temperatures upon the application of ultraviolet light in less than about 30 seconds. Those photoinitiators which convert visible light to ultraviolet light are chosen from the group consisting of pigments, photosensitizers and combinations thereof.

The photosensitizers are chosen from the group of peroxides, anthracene, perylene, acridine orange, acridine yellow, phosphine R, benzoflavin, setoflavin, aromatic hydrocarbons, benzophenone and derivatives thereof, esters of o-benzoylbenzoic acids, acetophenone and derivatives thereof, benzoin and benzoin ethers and derivatives thereof, xanthone and derivatives thereof, thioxanthone and derivatives thereof, disulfide compounds, quinone compounds, halogenated hydrocarbons, amines, etc.

Typical examples of the aromatic hydrocarbon are benzene, benzene-d$_6$, toluene, p-xylene, fluorobenzene, chlorobenzene, bromobenzene, iodobenzene, naphthalene, 1-methylnaphthalene, 2-methylnaphthalene, 1-fluoronaphthalene, 1-chloronaphthalene, 2-chloronaphthalene, 1-bromonaphthalene, 2-bromonaphthalene, 1-iodonaphthalene, 2-iodonaphthalene, 1-naphthol, 2-naphthol, biphenyl, fluorene, p-terphenyl, acenaphthene, p-quaterphenyl, triphenylene, phenanthrene, azulene, fluoranthene, chrycene, pyrene, 1,2-benzpyrene, anthracene, 1,2-benzanthracene, 9,10-dichloroanthracene, 9,10-dibromoanthracene, 9,10-diphenylanthracene, perylene, tetracene, pentacene, benzyl, etc.

The benzophenone and the derivatives thereof may include, for example, benzophenone, 2,4-dimetbylbenzophenone, 2,4-dichlorobenzophenone, 4,4'-bis(dimethylamino)benzophenone, etc.

The esters of o-benzoylbenzoic acids may include, for example, methyl o-benzoylbenzoate, ethyl o-benzoylbenzoate, phenyl o-benzoylbenzoate,

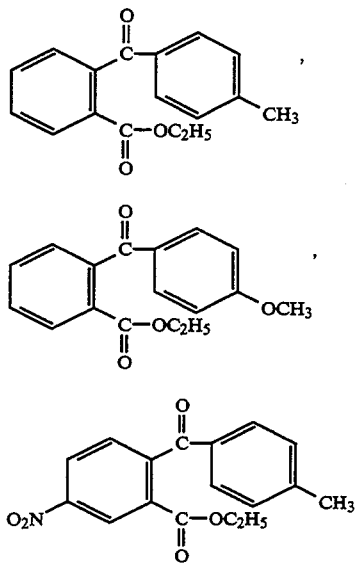

etc.

The acetophenone and the derivatives thereof may include, for example, acetophenone, 4-methylacetophenone, 3-methylacetophenone, 3-methoxyacetophenone, etc. The benzoin, the benzoin ethers and the derivatives of these may include, for example, benzoin, benzoin methyl ether, benzoin ethyl ether, benzoin isopropyl ether, benzoin n-butyl ether, benzoin triphenylsilyl ether,

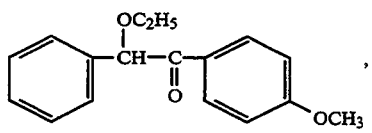

etc.

The xanthone and the derivatives thereof may include, for example, xanthone, 2,4-dimethylxanthone, 2,4-dichloroxanthone, etc.

The thioxanthone and the derivatives thereof may include, for example, isopropylthioxanthone, thioxanthone, 2,4-dimethylthioxanthone, 2,4-dichlorothioxanthone, etc.

The disulfide compounds may include, for example:

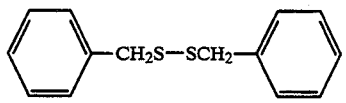

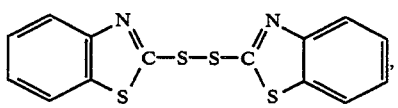

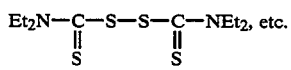

The quinone series compounds may include, for example, benzoquinone, naphthoquinone, anthraquinone, 5,12-naphthacene dione, 2,7-pyrene dione, etc.

The halogenated hydrocarbons may include, for example, carbon tetrachloride, hexachloroethane, carbon tetrabromide,

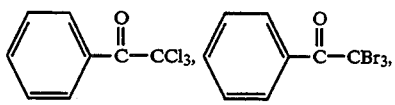

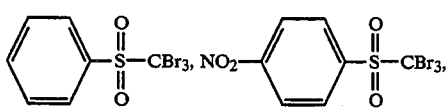

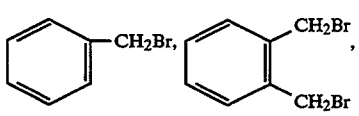

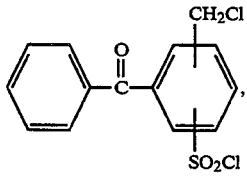

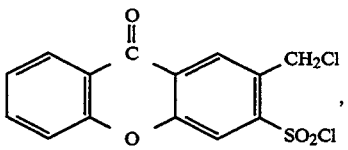

-continued

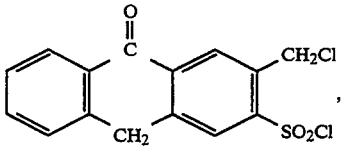

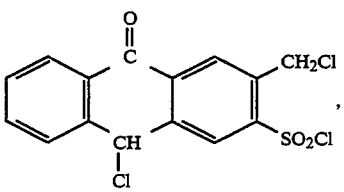

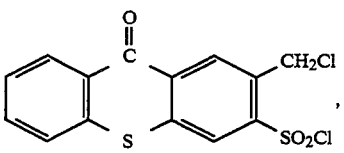

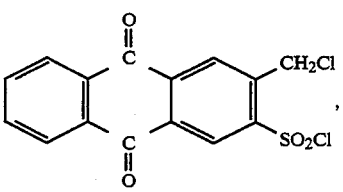

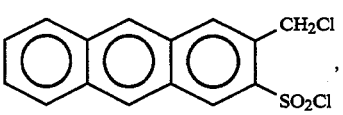

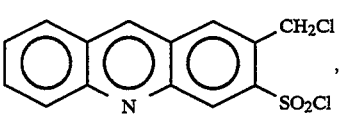

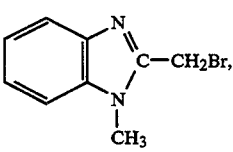

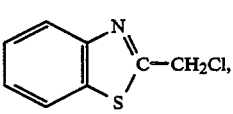

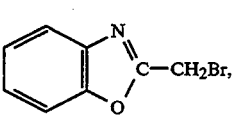

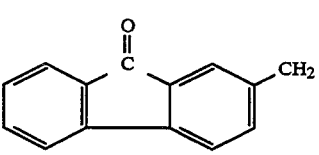

etc.

The amines may include for example, diphenyl amine, carbazole, triphenylamine,

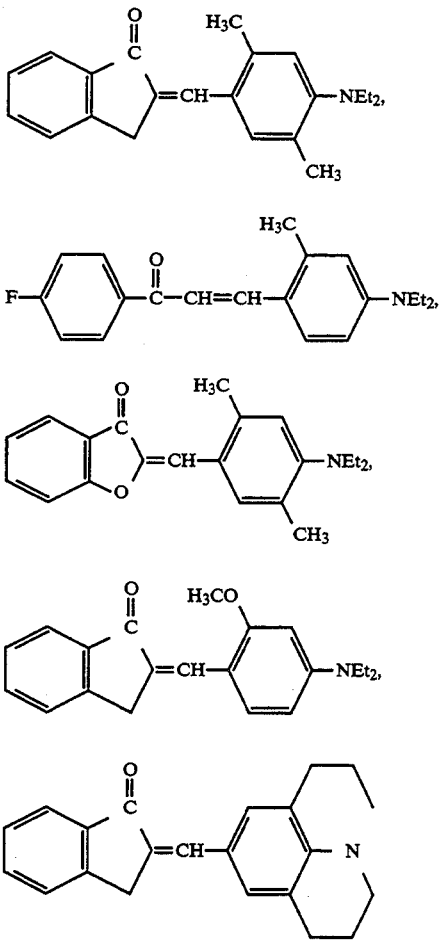

etc.

Other photosensitizers may include, for example, propiophenone, anthrone, benzaldehyde, butylophenone, 2-naphthylphenylketone, 2-naphthaldehyde, 2-acetonaphthone, 1-naphthylphenylketone, 1-acetonaphthone, 1-naphthoaldehyde, fluorenone, 1-phenyl-1,2-propane dione, benzonitorile, acetone, biacetyl, acridine orange, acridine, Rhodamine-B, eosine fluorescein,

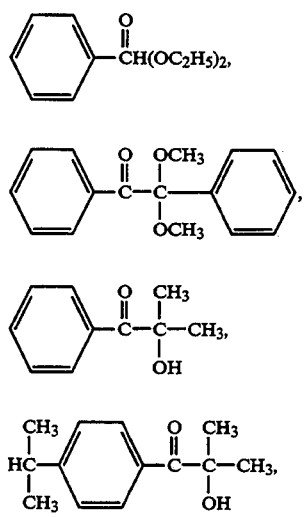

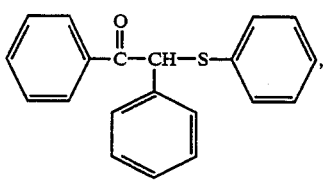

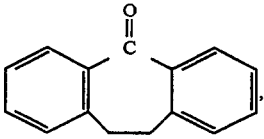

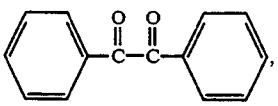

etc.

The photosensitizers exemplified above may be used alone or in combination, and should be mixed preferably in an amount of from 0 to 5 parts by weight, more preferably, 0.01 to 5 parts by weight, based on the epoxy resin component.

The use of photosensitizers to convert visible light to ultraviolet light depends upon the exposure and light source to be used in photo hardening the balancing compound of the invention. These light sources may include a low pressure mercury lamp, moderate pressure mercury lamp, or a high pressure mercury lamp, an ultra-high pressure mercury lamp, a xenon lamp, a metal halide lamp or combinations thereof.

A wetting agent is also used in combination with the epoxy resin, the photoinitiator and the filler of the improved balancing compound of the invention. Sufficient wetting agent is used to reduce the surface energy of the resin of the balancing compound to a level that all of the filler is wet with the resin. It is imperative that the resin completely wet the filler to minimize or preferably eliminate the refraction or reflection of ultraviolet light at the resin/filler interface. Such refraction and reflection is paramount to an unwanted opaqueness of the compound. Any opaqueness of the compound inhibits the cure of the resin of the compound. Wetting agents are chosen from the group consisting of hydrocarbons, silicones, florochemicals and other surfactants and combinations thereof. Useful silicones include mythoxyterminated polydimethylsiloxanes, butoxyterminated polydimethylsiloxanes, and hydroxyterminated polydimethylsiloxanes. Useful fluoro-chemicals include ammonium perfluoroalkyl sulfonates, potassium perfluoroalkyl sulfonates, amine perfluoroalkyl sulfonates, fluorinated alkyl amphoteric mixture, potassium fluorinated alkyl carboxylates, fluorinated alkyl quaternary ammonium iodides, ammonium perfluoroalky carboxylates, fluorinated alkyl polyoxyethylene ethanols, fluorinated alkyl alkoxylate, fluorinated alkyl esters. Useful hydrocarbons include the acrylics such as PC1244 sold by Monsanto Company of St. Louis, Mo.

Catalysts are also used in combination with the epoxy resin, polyol, photoinitiator, filler, pigments and photo sensitizers, wetting agent, thixotrope in the improved balancing compound of the invention. These catalysts are used in combination with the photoinitiator and the resin to cure the resin at ambient temperatures upon the application of ultraviolet light at the concentration and time of incidence required. These catalysts include copper salt catalysts, hydroperoxide catalysts and combinations thereof. Such catalysts as copper salt catalysts can be a copper halloid, bromide chloride or copper styrate, copper glutonate, copper citrate, copper napthalate and the lie or combinations thereof.

The preferred amine triflates that can be used as catalysts in the present invention include $CF_3SO_3H.N(C_6H_5)$, $CF_3SO_3H.NH_3$,
$CF_3SO_3H.CH_3NH_2$, $CF_3SO_3H.(CH_3)_3N$,
$CF_3SO_3H.CH_2H_5NH_2$,
$CF_3SO_3H.(C_2H_5)_2NH$,
$CF_3SO_3H.(C_2H_5)_3N$,
$CF_3SO_3H.(iP-C_3H_7)_2NH$,
$CF_3SO_3H.(i-C_3H_7)_2N(C_2H_5)$,
$CF_3SO_3H.(i-C_3H_7)_2N(C_2H_4OH)$,
$CF_3SO_3H.H_2N(C_2H_4OH)$,
$CF_3SO_3H.HN(C_5H_8O)$,
$CF_3SO_3H.H_2NC(CH_3)_2CH_2OH$,
$CF_3SO_3H.HN(C_6H_{11})$,
$CF_3SO_3H.HN(C_2H_4OH)_2$,
$CF_3SO_3.(CH_3)_4N$ and the like, including mixtures thereof.

Preferred metal salts of sulfonic acid which can be used as catalysts in the present invention include the metal salts of $CF_3SO_3H$,
$C_8F_{17}SO_3H$, $CF_3C_6F_{10}SO_3H$,
$C_3F_7SO_3H$, $C_2F_5SO_3H$, $C_2HF_4SO_3H$,
$C_3F_7CHFCF_2SO_3H$,$(CF_3)_2CHCF_2SO_3H$,
$C_4F_7SO_3H$, $(CF_3)_2CF(CF_2)_4SO_3H$,
$C_4F_9CFHCF_2SO_3H$,
$C_3H_7CH(CF_3)CF_2SO_3H$, $C_{11}F_{23}SO_3H$,
$C_5H_{11}CFHCF_2SO_3H$, $C_7F_{15}CFHCF_2SO_3H$, and the like, including mixtures thereof. Representative of the metal cat ions of such metal salts are those of the metals lithium, sodium, potassium, magnesium, calcium, strontium, barium, yitrium, vanadium, manganese, cobalt, nickel, copper, silver, zinc, cadmium, mercury, lead, bismuth, tungsten, lanthanum, neodymium, tin and gadolinium.

Other sulfonic acids and their derivatives can also be used to prepare the adducts of the present invention and include para-toluene sulfonic acid, dinonylnaphthylene sulfonic acid, alkyl sulfonic acids and the like.

The sulfonic acid metal salts used in this invention can be prepared by simply neutralizing the sulfonic acid precursors with a metal oxide, hydroxide, or carbonate or metal salt. The amino and ammonium salts can be formed by neutralization of the sulfonic acids with a salt-forming primary, secondary or tertiary amine, ammonia, or quaternary ammonium hydroxide. These latent forms of the sulfonic acid catalysts can be activated by heating them in the presence of the polycaprolactone polyol and polyepoxide to generate the sulfonic acid in its free acid form to make it available for catalyzing the reaction.

The sulfonic acid catalysts and derivatives thereof can be used in amounts varying from about 1 ppm to about 10,000 ppm or even greater (from about 0.0001 parts percent to about 5.0 parts based on the resin. The preferred concentration of sulfonic acid catalyst and derivatives thereof ranges from about 5 ppm to about 5,000 ppm (from about 0.0005 parts to about 0.5 parts Based on the resin). The most preferred concentration of sulfonic acid catalyst and derivatives thereof used in this invention ranges from about 50 ppm to about 4,000 ppm (from about 0.005 parts to about 0.4 parts based on the resin).

The most preferred sulfonic acid catalysts and derivatives thereof useful in preparing the adduct compositions of the present invention include diethylammonium triflate, trifluoromethanesulfonic acid, ammonium triflate, di-isopropyl-ethyl ammonium triflate and di-isopropyl ammonium triflate. Some of these catalysts are commercially available from the 3M Company.

Thermohardening catalysts can also be used. These thermohardening catalysts for catalyzing the thermal reaction of the epoxy group, known epoxy-hardening accelerators may be used. Examples include amines, for example, aliphatic primary amines, for example, polyamines such as diethylenetriamine, triethylenetetramine, tetraethylenepentamine, iminobispropylamine (dipropyltriamine), bis(hexamethylenetriamine and 1,3,6-trisaminomethylhexane, polymethylenediamines such as trimethylhexamethylenediamine, polyetherdiamine and diethylaminopropylamine, and alicyclic polyamines such as menthenediamine, isophoronediamine, bis(4-amino-3-methylcyclohexyl)methane and N-aminoethylpiperazine, aromatic primary amines such as methaphenylenediamine, diaminophenylmethane, diamininophenylsulfone and eutectic mixtures of aromatic diamines, modified amines such as polyamine epoxy resin adducts, polyamine-ethylene oxide adduct, polyamine-propylene oxide adduct, cyanoethylated polyamine and ketoimine; secondary amines such as piperidine, piperazine and morpholine; and tertiary amines such as tetramethylguanidine, triethanolamine, benzyldimethyl-amine and 2,4,6-tris(dimethylaminomethyl)phenol; acid anhydrides, for example, aromatic acid anhydrides such as phthalic anhydride, trimellitic anhydride, ethylene glycol bis(anhydrotrimellitate), glycerol tris(anhydrotrimellitate), pyromellitic anhydride and 3,3',-4,4'-benzophenone tetracarboxylic anhydride; alicyclic acid anhydrides such as maleic anhydride, succinic anhydride, tetrahydrophthalic anhydride, methyltetrahydro phthalic anhydride, endomethylenetetrahydrophthalic anhydride, methylendomethylenetetrahydrophthalic anhydride, alkenylsuccinic anhydride, hexahydrophthalic anhydride, methylhexahydrophthalic anhydride and methylcyclobexenetetracarboxylic anhydride; aliphatic acid anhydrides such as polyadipic anhydride, polyazelaic anhydride and polysebacic anhydride; and halogenated acid anhydrides such as chlorendic anhydride and tetrabromophthalic anhydride; imidazole compounds such as 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-metbylimidazole, 1-cyanoethyl-2-ethyl-4-methylimidazole, 1-cyanoethyl-2-undecylimidazole, 1-cyanoethyl-2-undecylimdazo trimellitate, 1-cyanoethyl-2-phenylimidazolium trimellitate, 2-metbylimidazolium isocyanurate, 2-phenylimidazolium isocyanurate, 2,4-diamino-6-[2-methylimidazolyl-(1)]ethyl-S-triazine, 2,4-diamino-6-[2-ethyl-1)]-ethyl-S-triazine, 2,4-diamino-6-[2-undecylimidazolyl-(1)-ethyl-S-triazine, 2-phenyl-4-methyl-5-hydroxymethylimidazole, 2-phenyl-4,5-dihydroxyrethylimidazole, 1-cyanoethyl-2-phenyl-4,5-di(cyanoethoxy-methyl)imidazol e, 1-dodecyl-2-methyl-3-benzylimidazolium chloride and 1,3-dibenzyl-2-methylimidazolium chloride; phenols such as novolak type phenol resins, cresol type phenol resins, resorcinol type phenol resins and polyvinylphenol; Lewis acid/amine complexes such as boron trifluoride/amine complex, boron pentafluoride/amine complex and arsenic pentafluoride/amine complex, dicyandiamides such as dicyandiamide, o-tolylbiguanide, phenylbiguanide and a-2,5-dimethylbiguanide, organic acid hydrazides such as succinic acid hydrazide, adipic acid hydrazide, isophthalic acid hydrazide and p-oxybenzoic acid hydrazide; diaminomaleonitrile derivatives such as diaminomaleonitrile and benzyl diaminomaleonitrile, melamine derivatives such as melamine and N,N-diarylmelamine, amineimide derivatives and polymercaptanes.

One of these thermohardening catalysts or a mixture thereof may be used preferably in an amount of from about 0.01 to 10 parts by weight, more preferably from about 0.05 to 5 parts by weight, based on 100 parts by weight of the resin component of the liquid light-sensitive resin composition. When the amount of the same is less than about 0.01 part by weight, the resulting film shows an insufficient strength. When it exceeds about 10 parts by weight, on the other hand, the resulting liquid light-sensitive resin composition suffers from some problems such as precipitation of crystals or a decrease in the stability of the liquid.

The following examples of the improved balancing compound of the invention will be better understood.

EXAMPLE 1

A balancing compound of the invention was formulated by mixing 100 parts of a bisphenol-A epoxy resin (DER 331 from Dow Chemical Company, Midland, Mich.) with 3.0 parts of a florinated wetting agent (FC-171 from Minnesota Mining & Mfg., Inc. of Minneapolis, Minn.) and 12 parts of a fumed silica filler (Cabosil 720TS from Cabot Laboratories, Inc. of Boston, Mass.) and 1.5 parts of an onium salt photoinitiator (FX-512 from Minnesota Mining & Mfg., Inc. of Minneapolis, Minn.). The resin, wetting agent, filler and photoinitiator were intimately mixed to form a paste.

The balancing composition was placed upon a rotor to be Balanced, the balancing composition not being sufficiently tacky, adherent or cohesive to adhere to the rotor during dynamic testing before curing, the balancing composition having no slump at room temperature, and a specific gravity above 1.1. The rotor was exposed to ultraviolet light (10 nm to about 400 nm) of less than about 40 watts per square centimeter for about 30 seconds.

The rotor was dynamically tested and determined to be balanced. The rotor was spin tested at 15,000 rpm at a temperature of 300° F. for 30 seconds to determine whether or not the Balancing compound was fully cured. The balancing compound was fully cured. The rotor was then dynamically tested again. The rotor was in balance.

EXAMPLE 2

A balancing compound of the invention was formulated by mixing 50 parts of cycloalphatic resin and 20 parts of Hexadecane resin (UVR6105 and UVR6212, respectively from Union Carbide Corporation, Danbury, Conn.) with 2.5 parts of a silicone wetting agent (L-7604 from Union Carbide Corporation of Danbury, Conn.) and 30 parts Caprolactone triol (UVR0310 from Union Carbide Corporation of Danbury, Conn.) and 1 part of an onium salt photoinitiator (UVI6990 from Union Carbide Corporation of Danbury, Conn.) and 200 parts of 100 mesh filler (Fused Quartz, from various suppliers, and 0.3 parts isopropylthioxanthone sensitizer (ITX from Biddle-Sawyer). The resins, wetting agent, filler, photoinitiator, triol and sensitizer were intimately mixed to form a paste.

The balancing composition was placed upon a rotor to be balanced, the balancing composition not being sufficiently tacky, adherent or cohesive to adhere to the rotor during dynamic testing before curing, the balancing composition having no slump at room temperature, and a specific gravity above 1.1. The rotor was exposed to ultraviolet light (10 nm to about 400 nm) of less than about 40 watts per square centimeter for about 30 seconds. The rotor was dynamically tested and determined to be balanced. The rotor was spin tested at 15,000 rpm at a temperature of 300° F. for 30 seconds to determine whether or not the balancing compound was fully cured. The balancing compound was fully cured. The rotor was then dynamically tested again. The rotor was in balance.

EXAMPLE 3

A balancing compound of the invention was formulated by mixing 80 parts of cycloalphatic and cresol novolac resins (CY-179 and ECN, respectively, from Ciba-Geigy) with 0.01 parts of acrylic wetting agent (PC-1244 from Monsanto Company of St. Louis, Mo.) and 1.5 parts ferrocenium salt photoinitiator (Irgacure 261 from Ciba-Geigy) and 300 parts of −325 mesh filler (quartz powder available from various suppliers) and isopropylthioxanthone and cumenebydroperoxide sensitizers (ITX by Biddle-Sawyer and CHP by Atochem, respectively). The resins, wetting agent, filler, photoinitiator and sensitizers were intimately mixed to form a putty.

A sufficient amount of putty was applied to the rotor to balance the rotor. The putty had a specific gravity above 1.1. The putty had no slump at room temperature. The putty was sufficiently tacky, adherent and cohesive to adhere to the rotor during dynamic testing. The rotor was dynamically tested. The rotor was not in balance. A small amount of putty was removed from the rotor. The rotor was again tested for balance. The rotor was in balance. The putty was cured by exposing the rotor to ultraviolet light (about 10 nm to about 400 nm) for about 40 watts per square centimeter for about 30 seconds. The cure of the balancing compound was tested by spin testing the rotor at 15,000 rpm at 300° F. for 30 seconds. The rotor was dynamically tested for balance. The rotor was in balance.

EXAMPLE 4

A balancing compound of the invention was formulated by mixing 100 parts of a bisphenol-A expoxy resin (Epon 828 from Shell Chemical) with 1.0 part of a fluorinated wetting agent (FC-171 from Minnesota Mining & Mfg., Inc. of Minneapolis, Minn.) and 2.0 parts onium salt photoinitiator (UVI-6990 from Union Carbide Corporation of Danbury, Conn.) and 320 parts of −325 mesh filler (quartz powder, available from various suppliers) and an anthracene sensitizer (Anthracene by Aldrich Chemical). The resin, wetting agent, filler, photoinitiator and sensitizer were intimately mixed to form a putty.

A sufficient amount of putty was applied to the rotor to balance the rotor. The putty had a specific gravity above 1.1. The putty had no slump at room temperature. The putty was sufficiently tacky, adherent and cohesive to adhere to the rotor during dynamic testing. The rotor was dynamically tested. The rotor was not in balance. A small amount of putty was removed from the rotor. The rotor was again tested for balance. The rotor was in balance. The putty was cured by exposing the rotor to ultraviolet light (about 10 nm to about 400 nm) for about 40 watts per square centimeter for about 30 seconds. The cure of the balancing compound was tested by spin testing the rotor at 15,000 rpm at 300° F. for 30 seconds. The rotor was dynamically tested for balance. The rotor was in balance.

EXAMPLE 5

A balancing compound of the invention was formulated by mixing 90 parts of cycloaliphatic epoxy resin (UVR6110 from Union Carbide Corporation of Danbury, Conn.) with 1.0 parts of silicone wetting agent (Silwet L-7604 from Union Carbide Corporation of Danbury, Conn.) and 1.5 parts onium salt photoinitiator (UVI6990 from Union Carbide Corporation of Danbury, Conn.) and 250 parts of −100 mesh filler (fused quartz, available from various suppliers) and 10 parts caprolactone epoxy triol (UVR0310 from Union Carbide Corporation of Danbury, Conn.) and 4.0 parts fumed silica thixotrope (Cabosil 720TS from Cabot Laboratories of Boston, Mass.). The resin, wetting agent, filler, photoinitiator, triol and thixotrope were intimately mixed to form a paste.

The balancing composition was placed upon a rotor to be balanced, the balancing composition not being sufficiently tacky, adherent or cohesive to adhere to the rotor during dynamic testing before curing, the balancing composition having no slump at room temperature, and a specific gravity above 1.1. The rotor was exposed to ultraviolet light (10 nm to about 400 nm) of less than about 40 watts per square centimeter for about 30 seconds. The rotor was dynamically tested and determined to be balanced. The rotor was spin tested at 15,000 rpm at a temperature of 300° F. for 30 seconds to determine whether or not the balancing compound was fully cured. The balancing compound was fully cured. The rotor was then dynamically tested again. The rotor was in balance.

The improved balancing compound of the invention is a single part epoxy based composition which can be applied to a rotor as either a paste or a putty, does not require mixing prior to use, cure rapidly at room temperature, has a long shelf life, and meets all of the objects of the invention.

While a specific embodiment of the invention has Been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A method of balancing a rotor which comprises applying to the rotor a balancing composition which comprises an epoxy resin, a photoinitiator in an amount sufficient to cause cationic polymerization and cure said resin upon the application of ultraviolet light (about 10 nm to about 400 nm), and a filler in an amount to give said composition a specific gravity above 1.1, said filler not being ultraviolet light opaque and selected from a group consisting of quartz, silica, and the combination thereof, and exposing the balancing composition at ambient temperature to ultraviolet light of less than 40 watts per square centimeter for less than 30 seconds and curing said resin.

2. The method of claim 1 wherein said resin is selected from the group consisting of bisphenol-A, bisphenol-F, novolak, difunctional glycidol ester, and cycloaliphatic based epoxy resins, and combinations thereof.

3. The method of claim 1 wherein said resin consists of about 13% to about 90% weight of said composition.

4. The method of claim 1 wherein said composition further comprises a polyol up to about 100 parts per 100 parts of said resin.

5. The method of claim 4 wherein said polyol is chosen from the group consisting of polycaprolactone alcohols, polyether alcohols, polyester alcohols, other monofunctional alcohols, other difunctional alcohols, other trifunctional alcohols, and combinations thereof.

6. The method of claim 1 wherein said composition is homogeneous.

7. The method of claim 1 wherein, said photoinitiator is present from about 0.1 to about 4 parts per 100 of said resin.

8. The method of claim 1 wherein said photoinitiator initiator is selected from the groups consisting of onium salts, iron salts, and combinations thereof.

9. The method of claim 1 wherein said photoinitiator is selected from the group consisting of organic compounds having an acid component, wherein said acid component forms a Lewis acid during the resin curing process.

10. The method of claim 1 wherein said composition further comprises a wetting agent sufficient to reduce the surface energy of said resin to a level that said filler is wet with said resin.

11. The method of claim 10 wherein said wetting agent is selected from the group consisting of hydrocarbon, silicone, fluorochemical, and other surfactants and combinations thereof.

12. The method of claim 10 wherein said wetting agent is present in an amount from about 0.001 to about 1.0 parts per 100 of said resin.

13. The method of claim 1 further comprising a wetting agent in an amount sufficient to minimize refraction and reflection of ultraviolet light at the resin/filler interface.

14. The method of claim 1 wherein said filler is present in an amount sufficient to maintain said photoinitiator in suspension and said composition homogeneous.

15. The method of claim 14 wherein said filler is present in an amount less than 20 parts per 100 of said resin.

16. The method of claim 1 wherein said composition further comprises a catalyst which in combination with said photoinitiator will cure said resin at ambient temperatures upon the application of ultraviolet light of less than 40 watts per square centimeter in less than about 30 seconds.

17. The method of claim 16 wherein said catalyst is selected from the group consisting of copper salt and hydroperoxide catalysts and combinations thereof.

18. The method of claim 16 wherein said catalysts are present in an amount from about 0.01 to about 5 parts per 100 of said resin.

19. The method of claim 1 wherein said resin when cured is cross-linked through said epoxy groups.

20. The method of claim 1 wherein said composition has no slump at room temperature, is sufficiently tacky, adherent and cohesive to adhere to the rotor during dynamic testing before curing, said method comprising, prior to the step of exposing, the step of dynamically testing the rotor with said balancing composition in position thereon and adjusting the amount of balancing composition on the rotor to achieve balance.

21. The method of claims 20 wherein the amount and position of the balancing composition is adjusted and dynamic testing of the rotor is repeated until the desired degree of balance is attained before the resin is cured.

22. The method of claim 20 wherein said adjusting step includes adjusting both the amount and the position of the balancing composition on the rotor and dynamically retesting the rotor until the desired degree of balance is attained.

23. The method of claim 1 further comprising, after the step of exposing, the step of dynamically testing the rotor with the balancing composition in position thereon.

24. A method of balancing a rotor comprising applying to a rotor a balancing composition comprising an epoxy resin, a photoinitiator in an amount to cure said resin at ambient temperature upon the application of ultraviolet light (about 10 nm to about 400 nm) of less than 40 watts per square centimeter in less than about 30 seconds, and a filler in an amount to give said composition no slump at room temperature and a specific gravity above 1.1, the composition not being sufficiently tacky, adherent or cohesive to adhere to the rotor during dynamic testing before curing, curing said resin by exposing said composition to ultraviolet light of less than 40 watts per square centimeter for less than about 30 seconds, dynamically testing the rotor with the now cured balancing composition in position thereon, adding an additional amount of the balancing composition on the rotor to achieve the desired balance, if required, and then curing said additional resin.

25. The method of claim 24 wherein said adjusting step includes adjusting both the amount and position of the balancing composition on the rotor.

26. The method of claim 24 wherein said resin is chosen from the group consisting of bisphenol-A, bisphenol-F, novolak, difunctional glycidol ester, and cycloaliphatic based epoxy resins, organosilicon moners having a six member silicon dioxide ring, and sulfur containing moners having three and four member sulfur containing rings, and combinations thereof.

27. The method of claim 24 wherein said resin consists of about 13% to about 90% weight of said composition.

28. The method of claim 24 wherein said composition comprises a polyol up to about 100 parts per 100 parts of said resin.

29. The method of claim 28 wherein the Union Carbide R value of said polyol is less than 3.

30. The method of claim 28 wherein said polyol is selected from the group consisting of polycaprolactone alcohols, polyether alcohols, polyester alcohols, other monofunctional alcohols, other difunctional alcohols, other trifunctional alcohols, and combinations thereof.

31. The method of claim 24 wherein said filler is not ultraviolet light opaque.

32. The method of claim 24 wherein said filler is selected from the group consisting of quartz, silica, Pyrex, Flint and Crown glasses, and combinations thereof.

33. The method of claim 24 wherein said composition wets said filler.

34. The method of claim 24 wherein said composition is homogeneous.

35. The method of claim 24 further comprising a photoinitiator in an amount sufficient to cure said resin upon being exposed to ultraviolet light.

36. The method of claim 35 wherein said photoinitiator is present from about 0.1 to about 4 parts per 100 of said resin.

37. The method of claim 35 wherein said photoinitiator initiator is selected from the groups consisting of onium salts, iron salts and combinations thereof.

38. The method of claim 35 wherein said photoinitiator is selected from the group consisting of organic compounds having an acid component, wherein said acid component forms a Lewis acid during the resin curing process.

39. The method of claim 24 further comprising an effective amount of a photosensitizer to convert visible light into ultraviolet light.

40. The method of claim 24 wherein said photosensitizer is present in an amount less than 5.0 parts per 100 of said resin.

41. The method of claim 24 further comprising a wetting agent sufficient to reduce the surface energy of said resin to a level that said filler is wet with said resin.

42. The method of claim 41 wherein said wetting agent is selected from the group consisting of hydrocarbon, silicone, fluorochemical, and other surfactants and combinations thereof.

43. The method of claim 41 wherein said wetting agent is present in an amount from about 0.001 to about 1.0 parts per 100 of said resin.

44. The method of claim 41 further comprising a wetting agent in an amount sufficient to minimize refraction and reflection of ultraviolet light at the resin/filler interface.

45. The method of claim 24 wherein said filler is present in an amount sufficient to maintain said photoinitiator in suspension and said composition homogeneous.

46. The method of claim 45 wherein said fillers are chosen from the group consisting of quartz, silica, Pyrex, Flint and Crown glasses, and combinations thereof.

47. The method of claim 45 wherein said filler is present in an amount less than 20 parts per 100 of said resin, 48. The method of claim 24 further comprising a catalyst which in combination with said photoinitiator will cure said resin at ambient temperatures upon the application of ultraviolet light (about 10 nm to about 400 nm) of less than 40 watts per square centimeter in less than about 30 seconds.

49. The method of claim 48 wherein said catalyst is selected from the group consisting of copper salt and hydroperoxide catalysts and combinations thereof.

50. The method of claim 48 wherein said catalysts are present in an amount from about 0.01 to about 5 parts per 100 of said resin.

51. The method of claim 24 wherein said resin when cured is cross-linked through said epoxy groups.

* * * * *

UNITED STATES PATENT AND TRADEMARK OFFICE
CERTIFICATE OF CORRECTION

PATENT NO. : 5,384,339

DATED : January 24, 1995

INVENTOR(S) : Donn R. Starkey

It is certified that error appears in the above-identified patent and that said Letters Patent is hereby corrected as shown below:

Col. 4, line 20, change "epoxycyclobexylmethyl" to --epoxycyclohexylmethyl--.

Col. 5, line 64, change "trihydroxybexane" to --trihydroxyhexane--.

Col. 6, line 24, change "dialdebydes" to --dialdehydes--.

Col. 7, line 67, change "Butvat" to --Butvar--.

Col. 8, line 31, change "cyclobexanol" to --cyclohexanol--

Col. 9, line 57, change "(MW 2000)" to --(MW 2000)*.

Col. 10, line 47, change "monoetbyl" to --monoethyl--.

Col. 10, line 62, change "polytetrabydrofuran" to --polytetrahydrofuran--.

Col. 10, line 66, change "bexanediol" to --"hexanediol--.

Col. 11, line 5, change "dibydroxynaphthalene" to --dihydroxynaphthalene--.

Col. 11, line 27, change "triacryate" to --triacrylate--.

UNITED STATES PATENT AND TRADEMARK OFFICE
CERTIFICATE OF CORRECTION

PATENT NO. : 5,384,339

DATED : January 24, 1995

INVENTOR(S) : Donn R. Starkey

It is certified that error appears in the above-identified patent and that said Letters Patent is hereby corrected as shown below:

Col. 12, line 1, change "SbF6" to --$SbF_6$--.

Col. 13, line 42, change "Be" to --be--.

Col. 19, line 11, change "$CF_3SO_3H \cdot CH_2H_5NH_2$" to --$CF_3SO_3H \cdot C_2H_5NH_2$--.

Col. 19, line 66, change "Based" to --based--.

Col. 20, line 53, change "metbylimidazole" to --methylimidazole--.

Col. 21, line 40, change "Balanced" to --balanced--.

Col. 21, line 51, change "Balancing" to --balancing--.

Col. 22, line 29, change "cumenebydroperoxide" to --cumenehydroperoxide--.

Col. 23, line 49, change "Been" to --been--.

Signed and Sealed this

Fourth Day of July, 1995

BRUCE LEHMAN

*Attest:*

*Attesting Officer*          *Commissioner of Patents and Trademarks*